(12) United States Patent
Kimura et al.

(10) Patent No.: US 11,179,605 B2
(45) Date of Patent: *Nov. 23, 2021

(54) GOLF BALL

(71) Applicant: Bridgestone Sports Co., Ltd., Tokyo (JP)

(72) Inventors: Akira Kimura, Chichibushi (JP); Toru Ogawana, Chichibushi (JP); Katsunobu Mochizuki, Chichibushi (JP); Jun Shindo, Chichibushi (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/880,363

(22) Filed: May 21, 2020

(65) Prior Publication Data

US 2020/0306594 A1    Oct. 1, 2020

Related U.S. Application Data

(63) Continuation-in-part of application No. 16/383,973, filed on Apr. 15, 2019, now Pat. No. 10,695,618, (Continued)

(30) Foreign Application Priority Data

Oct. 20, 2015 (JP) ................................ 2015-206609

(51) Int. Cl.
*A63B 37/02* (2006.01)
*C08K 5/053* (2006.01)
(Continued)

(52) U.S. Cl.
CPC ........ *A63B 37/0076* (2013.01); *A63B 37/005* (2013.01); *A63B 37/0022* (2013.01); (Continued)

(58) Field of Classification Search
CPC ...... C08K 5/0025; C08K 5/0053; C08K 5/14; A63B 37/0076; A63B 37/0075; A63B 37/0051; A63B 37/022; C08L 21/00
See application file for complete search history.

(56) References Cited

U.S. PATENT DOCUMENTS 4,483,537 A * 11/1984 Hanada .............. A63B 37/0003
                                                      473/372
5,033,748 A     7/1991 Ebisuno
(Continued)

FOREIGN PATENT DOCUMENTS

JP      09-239068 A      9/1997
JP      H11-169485  *    6/1999  ............ A63B 37/00
(Continued)

*Primary Examiner* — John E Simms, Jr.
(74) *Attorney, Agent, or Firm* — Sughrue Mion, PLLC

(57) ABSTRACT

In order to satisfy at a high level the golf ball flight and control performances relied on by professional golfers and skilled amateurs, this invention provides a multi-piece solid golf ball G having a core 1, a cover 3 and an intermediate layer 2 therebetween wherein the core is formed of a rubber composition that includes an alcohol having a value obtained by dividing the molecular weight of the alcohol by the number of hydroxyl groups thereon which is 70 or less. Also, letting Hc be the JIS-C hardness at the center of the core, H12 be the JIS-C hardness at a position 12 mm from the core center and Ho be the JIS-C hardness at the surface of the core, the core has a hardness profile in which these hardnesses satisfy fixed relationships defined by specific formulas.

11 Claims, 1 Drawing Sheet

Related U.S. Application Data which is a continuation-in-part of application No. 15/848,582, filed on Dec. 20, 2017, now Pat. No. 10,300,344, which is a continuation-in-part of application No. 15/281,284, filed on Sep. 30, 2016, now Pat. No. 9,889,342.

(51) Int. Cl.

| | | |
|---|---|---|
| *A63B 37/00* | (2006.01) | |
| *C08L 9/00* | (2006.01) | |
| *C08K 3/22* | (2006.01) | |
| *C08K 3/24* | (2006.01) | |
| *C08K 5/14* | (2006.01) | |
| *C08K 5/136* | (2006.01) | |
| *C09D 175/04* | (2006.01) | |
| *C08L 75/08* | (2006.01) | |

(52) U.S. Cl.
CPC ...... *A63B 37/0051* (2013.01); *A63B 37/0063* (2013.01); *A63B 37/0065* (2013.01); *A63B 37/0075* (2013.01); *A63B 37/0096* (2013.01); *C08K 3/22* (2013.01); *C08K 3/24* (2013.01); *C08K 5/053* (2013.01); *C08K 5/136* (2013.01); *C08K 5/14* (2013.01); *C08L 9/00* (2013.01); *C08L 75/08* (2013.01); *C09D 175/04* (2013.01); *C08K 2003/2296* (2013.01); *C08L 2205/025* (2013.01); *C08L 2205/03* (2013.01)

(56) References Cited

U.S. PATENT DOCUMENTS

| | | | |
|---|---|---|---|
| 5,782,707 A | 7/1998 | Yamagishi et al. | |
| 6,210,295 B1 | 4/2001 | Yoneyama | |
| 6,458,307 B2 | 10/2002 | Inoue et al. | |
| 6,521,711 B1* | 2/2003 | Ohama | A63B 37/0003 473/373 |
| 6,592,470 B2 | 7/2003 | Watanabe et al. | |
| 6,663,507 B1 | 12/2003 | Watanabe et al. | |
| 6,702,695 B1 | 3/2004 | Higuchi et al. | |
| 6,723,008 B2 | 4/2004 | Higuchi et al. | |
| 6,739,986 B2 | 5/2004 | Higuchi et al. | |
| 6,746,345 B2 | 6/2004 | Higuchi et al. | |
| 6,746,347 B2 | 6/2004 | Higuchi et al. | |
| 6,814,676 B2 | 11/2004 | Watanabe et al. | |
| 7,959,524 B2 | 6/2011 | Nanba et al. | |
| 8,393,978 B2 | 3/2013 | Watanabe et al. | |
| 2002/0137849 A1* | 9/2002 | Kerns | C08F 36/04 525/201 |
| 2003/0104880 A1 | 6/2003 | Fushihara | |
| 2009/0111608 A1 | 4/2009 | Watanabe et al. | |
| 2010/0056299 A1 | 3/2010 | Egashira et al. | |
| 2010/0056304 A1 | 3/2010 | Egashira et al. | |
| 2012/0157234 A1 | 6/2012 | Kimura | |
| 2013/0109507 A1 | 5/2013 | Onuki | |
| 2013/0172113 A1 | 7/2013 | Isogawa et al. | |
| 2013/0203524 A1 | 8/2013 | Tarao et al. | |
| 2013/0296072 A1 | 11/2013 | Nakajima et al. | |
| 2013/0296075 A1 | 11/2013 | Kimura et al. | |
| 2013/0296076 A1 | 11/2013 | Kimura et al. | |
| 2013/0324318 A1 | 12/2013 | Isogawa et al. | |
| 2014/0073461 A1 | 3/2014 | Ozawa et al. | |
| 2014/0100059 A1* | 4/2014 | Kimura | A63B 37/0031 473/374 |
| 2014/0187351 A1 | 7/2014 | Nakamura et al. | |
| 2016/0279484 A1* | 9/2016 | Watanabe | A63B 37/0039 |
| 2016/0354644 A1* | 12/2016 | Watanabe | A63B 37/0092 |
| 2017/0106245 A1* | 4/2017 | Kimura | A63B 37/0063 |
| 2017/0173398 A1 | 6/2017 | Tachibana et al. | |
| 2017/0189765 A1 | 7/2017 | Watanabe | |
| 2017/0368418 A1 | 12/2017 | Nakajima | |
| 2018/0126224 A1* | 5/2018 | Shindo | A63B 37/005 |
| 2018/0133560 A1* | 5/2018 | Kimura | A63B 37/0076 |
| 2018/0371213 A1* | 12/2018 | Miyamoto | C09J 111/00 |
| 2019/0321688 A1 | 10/2019 | Watanabe | |
| 2019/0375917 A1* | 12/2019 | Shindo | C08K 5/098 |

FOREIGN PATENT DOCUMENTS

| | | |
|---|---|---|
| JP | 2001-054588 A | 2/2001 |
| JP | 2002-085587 A | 3/2002 |
| JP | 2002-085588 A | 3/2002 |
| JP | 2002-085589 A | 3/2002 |
| JP | 2002-186686 A | 7/2002 |
| JP | 2002-315848 A | 10/2002 |
| JP | 2003-190330 A | 7/2003 |
| JP | 2004-049913 A | 2/2004 |
| JP | 2009-034505 A | 2/2009 |
| JP | 2011-120898 A | 6/2011 |
| JP | 2013-176530 A | 9/2013 |

* cited by examiner

GOLF BALL

CROSS-REFERENCE TO RELATED APPLICATION

This application is a continuation-in-part of copending application Ser. No. 16/383,973 filed on Apr. 15, 2019, which is a continuation-in-part of copending application Ser. No. 15/848,582 filed on Dec. 20, 2017 (now U.S. Pat. No. 10,300,344), which is also a continuation-in-part of copending application Ser. No. 15/281,284 filed on Sep. 30, 2016 (now U.S. Pat. No. 9,889,342), claiming priority based on Japanese Patent Application No. 2015-206609 filed in Japan on Oct. 20, 2015, the entire contents of which are hereby incorporated by reference.

BACKGROUND OF THE INVENTION

The present invention relates to a multi-piece solid golf ball having a core, an intermediate layer, a cover and a paint film layer. More specifically, the invention relates to a multi-piece solid golf ball which is able to satisfy at a high level the flight and control performances relied on by professional golfers and skilled amateurs.

In the art relating to golf balls of two or more pieces having a core and a cover and multi-piece solid golf balls of three or more pieces having a core, an intermediate layer and a cover, a number of multi-piece solid golf balls have hitherto been disclosed which focus on, for example, the core hardness profile, the hardness relationship between the intermediate layer and the cover, and the intermediate layer material. Such golf balls are described in, for example, JP-A H9-239068, JP-A 2003-190330, JP-A 2004-49913, JP-A 2002-315848, JP-A 2001-54588, JP-A 2002-85588, JP-A 2002-85589, JP-A 2002-85587, JP-A 2002-186686, JP-A 2009-34505 and JP-A 2011-120898.

However, there is room for further improvement in the core hardness profile of these golf balls. Also, from a different standpoint other than that of seeking to optimize the core hardness profile and the overall hardness and thickness parameters of the ball, there also exists a desire for a solid golf ball which, by increasing the distance on shots with a driver (W #1) and improving the spin performance on approach shots with various short irons, further enhances performance over that in the prior art.

SUMMARY OF THE INVENTION

It is therefore an object of this invention to provide a golf ball which enhances performance over that of conventional golf balls and is able to satisfy at a high level the flight and control performances relied on by professional golfers and skilled amateurs.

As a result of extensive investigations, we have discovered that, assuming a ball construction having a core and a cover with an intermediate layer situated therebetween and having also a paint film layer formed on the cover surface, by specifying the core hardness profile and focusing on the relationship between the core hardness profile and the ball dynamic coefficient of friction, the performance can be enhanced over that of conventional golf balls, enabling the ball to satisfy at a high level the flight and control performances relied on by professional golfers and skilled amateurs. That is, we have found that, in the core hardness profile, by providing an inner zone of the core with a relatively gradual hardness gradient and an outer zone of the core with a relatively steep hardness gradient, and by making the hardness difference between the inner and outer zones of the core large, an even larger reduction in the spin rate of the ball on full shots can be achieved. We have also found that, defining the numerical value obtained by multiplying the hardness difference between the inner and outer zones by the dynamic coefficient of friction for the overall ball as the "spin index" of the ball, when this spin index is larger than a given value, the balance between the ball spin rate-lowering effect on full shots and the spin rate on approach shots (controllability) improves.

Accordingly, the invention provides a multi-piece solid golf ball having a core, a cover, and an intermediate layer situated therebetween and having a paint film layer formed on a surface of the cover, wherein the core is formed of a rubber composition containing the following ingredients (a) to (d):

(a) a base rubber,
(b) a co-crosslinking agent which is an α,β-unsaturated carboxylic acid and/or a metal salt thereof,
(c) a crosslinking initiator, and
(d) an alcohol having a value obtained by dividing the molecular weight of the alcohol by the number of hydroxyl groups which is 70 or less; and, letting Hc be the JIS-C hardness at a center of the core, H12 be the JIS-C hardness at a position 12 nun from the core center and Ho be the JIS-C hardness at a surface of the core, the core has a hardness profile which satisfies formulas (3) and (4) below $$(Ho-H12)-(H12-Hc) \geq 0 \quad (3)$$

$$22 \leq Ho-Hc \leq 40 \quad (4).$$

In a preferred embodiment of the invention, the ball has a dynamic coefficient of friction which is 0.300 or more.

Additionally, it is preferable for the JIS-C hardness Hc at the core center to be from 40 to 78 and for the JIS-C hardness Ho at the core surface to be from 65 to 99.

Also, letting H10 be the JIS-C hardness at a position 10 mm from the core center, it is preferable for the core hardness profile to satisfy formula (1)' below $$0 \leq H10-Hc \leq 15 \quad (1)'.$$

In another preferred embodiment of the invention, letting H10 be the JIS-C hardness at a position 10 mm from the core center, the core hardness profile satisfies formula (2)' below $$15 \leq Ho-H10 \leq 30 \quad (2)'.$$

Also, letting H10 be the JIS-C hardness at a position 10 mm from the core center, it is preferable for the core hardness profile to satisfy formula (3)' below $$(Ho-H10)-(H10-Hc) \geq 10 \quad (3').$$

In this case, letting (Ho–H10)–(H10–Hc) in formula (3)' be A', the spin index, defined as the dynamic coefficient of friction for the ball multiplied by A', is preferably 3.0 or more. Also, letting (Ho–H10)–(H10–Hc) in formula (3)' be A', the hardness profile index, defined as the deflection (mm) of the core when compressed under a final load of 1,275 N (130 kgf) from an initial load of 98 N (10 kgf) multiplied by A', is preferably 30 or more.

In yet another preferred embodiment of the invention, it is preferable for component (d) to be included in an amount, per 100 parts by weight of the base rubber (a), of from 0.5 to 5 parts by weight. Also, component (d) is a hexahydric or lower alcohol. It is preferable in particular for component (d) to be a substance selected from the group consisting of butanol, glycerol, ethylene glycol, propylene glycol, butanetriol, trimethylolethane, trimethylolpropane, di(trimethylolpropane), pentaerythritol and sorbitol.

BRIEF DESCRIPTION OF THE DIAGRAMS

DETAILED DESCRIPTION OF THE INVENTION

The invention is described more fully below.

Figure 1:
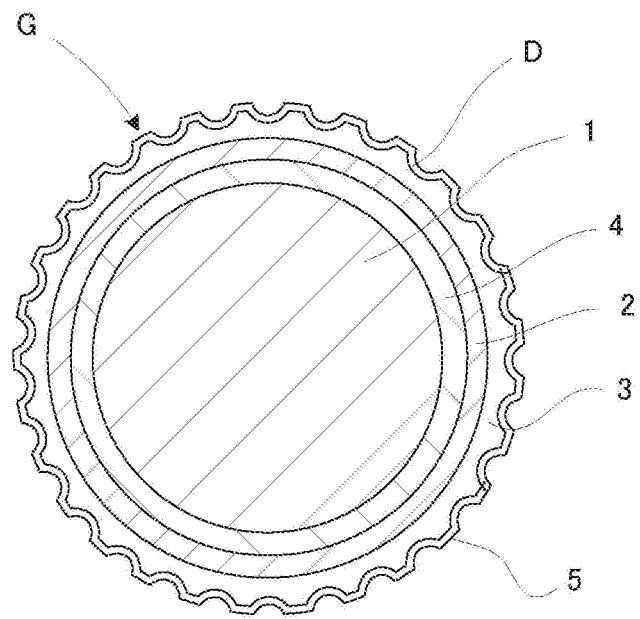
FIG. 1 is a schematic cross-sectional view of a golf ball according to one embodiment of the invention.

The golf ball of the invention has, in order from the inside: a core, an intermediate layer and a cover. Referring to FIG. 1, which shows the internal structure in one embodiment of the golf ball of the invention, the golf ball G has a core 1, an intermediate layer 2 encasing the core 1, and a cover 3 encasing the intermediate layer 2. A paint film layer 5 is formed on the surface of the cover. Numerous dimples D are generally formed on the surface of the cover 3 in order to improve the aerodynamic properties of the ball. In addition, the golf ball G in FIG. 1 has an envelope layer 4 formed between the core 1 and the intermediate layer 2. The respective layers are described in detail below.

The core diameter, although not particularly limited, is preferably from 34.7 to 41.7 mm, more preferably from 35.7 to 40.7 mm, and even more preferably from 36.7 to 39.7 mm. When the core diameter is too small, the spin rate-lowering effect of the core may not be exhibited, as a result of which the intended distance may not be obtained. When the core diameter is too large, the durability of the ball may worsen.

The core deflection (mm) when compressed under a final load of 1,275 N (130 kgf) from an initial load of 98 N (10 kgf), although not particularly limited, is preferably from 2.5 to 4.6 mm, more preferably from 2.7 to 4.4 mm, and even more preferably from 2.9 to 4.2 mm. When the core is too hard, the spin rate may rise, possibly resulting in a poor distance. On the other hand, when the core is too soft, the initial velocity of the ball may decrease, possibly resulting in a poor distance.

Letting Hc be the JIS-C hardness at the center of the core, the value of Hc is preferably from 40 to 78, more preferably from 45 to 73, and even more preferably from 50 to 68. When the JIS-C hardness at the core center is too large, the spin rate may rise, possibly resulting in a poor distance. On the other hand, when this value is too small, the initial velocity of the ball may decrease, possibly resulting in a poor distance.

Letting the JIS-C hardness at the surface of the core be Ho, the value of Ho is preferably from 65 to 99, more preferably from 70 to 98, and even more preferably from 75 to 97. When the JIS-C hardness at the core surface is too large, the durability of the ball to repeated impact may worsen. On the other hand, when this value is too small, the spin rate on full shots may not be suppressed, possibly resulting in a poor distance.

Letting the JIS-C hardness at a position 12 mm from the core center be H12, the value of H12 is preferably from 42 to 84, more preferably from 47 to 79, and even more preferably from 52 to 74. When this value is too large, the spin rate on full shots may not be suppressed, possibly resulting in a poor distance. On the other hand, when this value is too small, the durability of the ball to repeated impact may worsen.

The center hardness and the cross-sectional hardnesses at specific positions refer to the hardnesses measured at the center and at specific positions on a cross-section obtained by cutting the golf ball core in half through the center. The surface hardness refers to the hardness measured on the spherical surface of the core.

In this invention, the core satisfies formula (3) below:

$$(Ho-H12)-(H12-Hc) \geq 0 \quad (3)$$

Formula (3) means that the hardness difference between the inner and outer zones of the core is large, making it possible to lower the spin rate on full shots even further and thus enabling the desired effects of the invention to be achieved. The (Ho–H12)–(H12–Hc) value is 0 or more, preferably 1 or more, and more preferably 2 or more. When this value is small, the spin rate on full shots may not be suppressed, possibly resulting in a poor distance.

In this invention, the core preferably satisfies formula (4) below.

$$22 \leq Ho-Hc \leq 40 \quad (4).$$

Formula (4) means that the hardness difference between the core center and core surface is large. The lower limit value for Ho–Hc is preferably at least 22, and more preferably at least 25. The upper limit value is preferably not more than 40, and more preferably not more than 38. When this value is too large, the durability of the ball to repeated impact may worsen. On the other hand, when this value is too small, the spin rat on full shots may not be suppressed, possibly resulting in a poor distance.

Also, in the core hardness profile, letting H10 be the JIS-C hardness at a position 10 mm from the core center, it is preferable for formula (1)' or formula (2)' below to be satisfied.

$$0 \leq H10-Hc \leq 15 \quad (1)'$$

$$15 \leq Ho-10 \leq 30 \quad (2)'$$

Formula (1') means that the inner zone of the core has a relatively gradual hardness gradient. The lower limit value for H10 –Hc is preferably at least 0, more preferably at least 1, and even more preferably at least 2. The upper limit value is preferably not more than 15, more preferably not more than 14, and even more preferably not more than 13. When this value is too large, the durability to repeated impact may worsen. On the other hand, when this value is too small, the spin rate on full shots may not be suppressed, possibly resulting in a poor distance.

Formula (2)' means that the outer zone of the core has a relatively steep hardness is gradient. The lower limit value for Ho–H10 is preferably at least 15, more preferably at least 16, and even more preferably at least 17. The upper limit value is preferably not more than 30, and more preferably not more than 28. When this value is too large, the durability to repeated impact may worsen. On the other hand, when this value is too small, the spin rate on full shots may not be suppressed, possibly resulting in a poor distance.

Also, in the core hardness profile, it is preferable for the following formula (3)' to be satisfied.

$$(Ho-H10)-(H10-Hc) \geq 10 \quad (3')$$

Formula (3)' means that the hardness difference between the inner and outer zones of the core is large, thus allowing an even lower spin rate to be achieved on full shots and enabling the desired effects of the invention to be achieved.

The value (Ho–H10)–(H10–Hc) is preferably at least 10, more preferably at least 10.5, and even more preferably at least 11. When this value is small, the spin rate on full shots may not be suppressed, possibly resulting in a poor distance.

Letting (Ho–Hc)–(H10)–Hc) in formula (3) be A', the hardness profile index, defined as the deflection (mm) of the core when compressed under a final load of 1,275 N (130 kgf) from an initial load of 98 N (10 kgf) multiplied by A', is preferably at least 30, more preferably at least 31, and even more preferably at least 32. By setting the hardness profile index in this range, even when the core deflection is changed, ensuring that the index falls within the specified range enables a reduced spin rate to be achieved on full shots.

The core can be obtained by vulcanizing a rubber composition consisting primarily of a rubber material.

The core in the invention is formed of a rubber composition containing the following ingredients (a) to (d):
 (a) a base rubber,
 (b) a co-crosslinking agent which is an α,β-unsaturated carboxylic acid and/or a metal salt thereof,
 (c) a crosslinking initiator, and
 (d) an alcohol having a value obtained by dividing the molecular weight of the alcohol by the number of hydroxyl groups thereon which is 70 or less.

Ingredients other than components (a) to (d), such as sulfur, organosulfur compounds, fillers and antioxidants, may be optionally included in the rubber composition.

A polybutadiene is preferably used as the base rubber serving as component (a).

Rubber ingredients other than this polybutadiene may be included in the base rubber within a range that does not detract from the advantageous effects of the invention. Examples of such other rubber ingredients include other polybutadienes and also diene rubbers other than polybutadiene, such as styrene-butadiene rubber, natural rubber, isoprene rubber and ethylene-propylene-diene rubber.

The co-crosslinking agent serving as component (b) above is an α,β-unsaturated carboxylic acid and/or a metal salt thereof. Illustrative examples of unsaturated carboxylic acids include acrylic acid, methacrylic acid, maleic acid and fumaric acid. The use of acrylic acid or methacrylic acid is especially preferred. Metal salts of unsaturated carboxylic acids are exemplified by the foregoing unsaturated carboxylic acids which have been neutralized with a desired metal ion. Illustrative examples include the zinc salts and magnesium salts of methacrylic acid and acrylic acid. The use of zinc acrylate is especially preferred. These unsaturated carboxylic acids and/or metal salts thereof are included in an amount per 100 parts by weight of the base rubber which is preferably at least 10 parts by weight, more preferably at least 15 parts by weight, and even more preferably at least 20 parts by weight, The upper limit is preferably not more than 45 parts by weight, more preferably not more than 43 parts by weight, and even more preferably not more than 41 parts by weight.

An organic peroxide is preferably used as the crosslinking initiator serving as component (c). Specifically, the use of an organic peroxide having a relatively high thermal decomposition temperature is preferred, For example, an organic peroxide having an elevated one-minute half-life temperature of from about 165° C. to about 185° C., such as a dialkyl peroxide, may be used. Illustrative examples of dialkyl peroxides include dicumyl peroxide ("Percumyl D," from NOF Corporation), 2,5-dimethyl-2,5-di(t-butylperoxy) hexane ("Perhexa 25B," from NOF Corporation), and di(2-t-butylperoxyisopropyl)benzene ("Perbutyl P," from NOF Corporation). Preferred use can be made of dicumyl peroxide. These may be used singly or two or more may be used in combination. The half-life is one indicator of the organic peroxide decomposition rate, and is expressed as the time required for the original organic peroxide to decompose and the active oxygen content therein to fall to one-half. The vulcanization temperature for the core-forming rubber composition is generally in the range of 120° C. to 190° C. Within this range, the thermal decomposition of high-temperature organic peroxides having a one-minute half-life temperature of about 165° C. to about 185° C. is relatively slow. With the rubber composition of the invention, by regulating the amount of free radicals generated, which increases as the vulcanization time elapses, a crosslinked rubber core having a specific internal hardness profile is obtained.

The crosslinking initiator is included in an amount, per 100 parts by weight of the base rubber, of preferably at least 0.1 part by weight, more preferably at least 0.2 part by weight, and even more preferably at least 0.3 part by weight. The upper limit is preferably not more than 5.0 parts by weight, more preferably not more than 4.0 parts by weight, even more preferably not more than 3.0 parts by weight, and most preferably not more than 2.0 parts by weight. Including too much may make the core too hard, possibly resulting in an unpleasant feel at impact and greatly lowering the durability to cracking. On the other hand, when too little is included, the core may become too soft, possibly resulting in an unpleasant feel at impact and greatly lowering productivity.

Next, component (d) is an alcohol, and is defined as a substance having a value obtained by dividing the molecular weight by the number of hydroxyl groups thereon which is 70 or less. When this numerical value is 70 or less, a cured rubber product (core) having the desired core hardness profile of this application can be obtained and spin rate reduction of the ball when struck is fully achieved, enabling the ball to have an excellent flight performance. Here, "alcohol" refers to a substance having one or more alcoholic hydroxyl group; substances obtained by the polycondensation of polyhydric alcohols having 2 or more hydroxyl groups are also included among such alcohols. The term "alcohol" encompasses also sugar alcohols such as alditols.

It is especially preferable for the alcohol to be a hexahydric or lower alcohol (an alcohol having up to six alcoholic hydroxyl groups). Specific, examples include, but are not limited to, methanol, ethanol, propanol, butanol, ethylene glycol, diethylene glycol, propylene glycol, dipropylene glycol, tripropylene glycol, glycerol, butanetriol, trimethylolethane, trimethylolpropane, di(trimethylolpropane), pentaerythritol and sorbitol. These have molecular weights which, although not particularly limited, are preferably below 300, more preferably below 250, and even more preferably below 200. When the molecular weight is too large, i.e., when the number of carbons is too high, the desired core hardness profile may not be obtained or a reduced ball spin rate on impact may not be fully achieved.

The amount of component (d) included per 100 parts by weight of the base rubber serving as component (a) is preferably at least 0.1 part by weight, and more preferably at least 0.5 part by weight. The upper limit value is preferably not more than 10 parts by weight, more preferably not more than 6 parts by weight, and even more preferably not more than 3 parts by weight. When the amount of component (d) included is too high, the hardness may decrease and the desired feel, durability and rebound may not be obtained. When the amount included is too low, the desired core hardness profile may not be obtained and a reduced ball spin rate on impact may not be fully achieved.

Aside from above components (a) to (d), various other additives, such as fillers, antioxidants and organosulfur compounds, may be included, provided that doing so does not detract from the advantageous effects of the invention.

Fillers that may be suitably used include zinc oxide, barium sulfate and calcium carbonate. These may be used singly or two or more may be used in combination. The amount of filler included per 100 parts by weight of the base rubber may be set to preferably at least 1 part by weight, and more preferably at least 3 parts by weight. The upper limit in the amount included per 100 parts by weight of the base rubber may be set to preferably not more than 200 parts by weight, more preferably not more than 150 parts by weight, and even more preferably not more than 100 parts by weight. At a filler content which is too high or too low, a proper weight and a. suitable rebound may be impossible to obtain.

Commercial products such as Nocrac NS-6, N crac NS-30 or Nocrac 200 (all products of Ouchi Shinko Chemical Industry Co., Ltd.) may be used as antioxidants. These may be used singly, or two or more may be used in combination. The amount of antioxidant included per 100 parts by weight of the base rubber, although not particularly limited, is preferably at least 0.05 part by weight, and more preferably at least 0.1 part by weight. The upper limit is preferably not more than 1.0 part by weight, more preferably not more than 0.7 part by weight, and even more preferably not more than 0.4 part by weight. When the antioxidant content is too high or too low, a suitable core hardness gradient may not be obtained, as a result of which it may not be possible to obtain a good rebound, durability, and spin rate-lowering effect on full shots.

In addition, an organosulfur compound may be included in the rubber composition so as to impart an excellent rebound. Thiophenols, thionaphthols, halogenated thiophenols, and metal salts thereof are recommended for this purpose. Illustrative examples include pentachlorothiophenol, pentafluorothiophenol, pentabromothiophenol, p-chlorothiophenol, and the zinc salt of pentachlorothiophenol; and also diphenylpolysulfides, dibenzylpolysulfides, dibenzoylpolysulfides, dibenzothiazoylpolysulfides and dithiobenzoylpolysulfides having 2 to 4 sulfurs. The use of diphenyldisulfide or the zinc salt of pentachlorothiophenol is especially preferred.

The amount of the organosulfur compound included per 100 parts by weight of the base rubber is at least 0.05 part by weight, preferably at least 0.07 part by weight, and more preferably at least 0.1 part by weight. The upper limit is not more than 5 parts by weight, preferably not more than 4 parts by weight, more preferably not more than 3 parts by weight, and most preferably not more than 2 parts by weight. Including too much organosulfur compound may excessively lower the hardness, whereas including too little is unlikely to improve the rebound.

Decomposition of the organic peroxide within the core formulation can be promoted by the direct addition of water (or a water-containing material) to the core material. It is known that the decomposition efficiency of the organic peroxide within the core-forming rubber composition changes with temperature and that, starting at a given temperature, the decomposition efficiency rises with increasing temperature. If the temperature is too high, the amount of decomposed radicals rises excessively, leading to recombination between radicals and, ultimately, deactivation. As a result, fewer radicals act effectively in crosslinking. Here, when a heat of decomposition is generated by decomposition of the organic peroxide at the time of core vulcanization, the vicinity of the core surface remains at substantially the same temperature as the temperature of the vulcanization mold, but the temperature near the core center, due to the build-up of heat of decomposition by the organic peroxide which has decomposed from the outside, becomes considerably higher than the mold temperature. In cases where water (or a water-containing material) is added directly to the core, because the water acts to promote decomposition of the organic peroxide, radical reactions like those described above can be made to differ at the core center and core surface. That is, decomposition of the organic peroxide is further promoted near the center of the core, bringing about greater radical deactivation, which leads to a further decrease in the amount of active radicals. As a result, it is possible to obtain a core in which the crosslink densities at the core center and core surface differ markedly. It is also possible to obtain a core having different dynamic viscoelastic properties at the core center.

Along with achieving a lower spin rate, golf balls having such a core also exhibit an excellent durability and undergo little change over time in rebound.

The water included in the core material is not particularly limited, and may be distilled water or tap water. The use of distilled water which is free of impurities is to especially preferred. The amount of water included per 100 parts by weight of the base rubber is preferably at least 0.1 part by weight, and more preferably at least 0.3 part by weight. The upper limit is preferably not more than 5 parts by weight, and more preferably not more than 4 parts by weight.

By including a suitable amount of such water, the moisture content in the rubber composition prior to vulcanization becomes preferably at least 1,000 ppm, and more preferably at least 1,500 ppm. The upper limit is preferably not more than 8,500 ppm, and more preferably not more than 8,000 ppm. When the moisture content of the rubber composition is too low, it may be difficult to obtain a suitable crosslink density and tan $\delta$, which may make it difficult to mold a golf ball having little energy loss and a reduced spin rate. On the other hand, when the moisture content of the rubber composition is too high, the core may end up too soft, which may make it difficult to obtain a suitable core initial velocity.

The core can be produced by vulcanizing/curing the rubber composition containing the above respective ingredients. For example, production may be carried out by kneading the composition using a mixer such as a. Banbury mixer or a roll mill, compression molding or injection molding the kneaded composition using a core mold, and curing the molded material by suitably heating it at a temperature sufficient for the organic peroxide or co-crosslinking agent to act, i.e., from about 100° C. to about 200° C. for 10 to 40 minutes.

Next, the crosslink density of the core is described.

In this invention, the crosslink density at the center of the core is preferably at least $6.0 \times 10^2$ mol/m$^3$ and preferably not more than $15.0 \times 10^2$ mol/m$^3$. The crosslink density at the surface of the core is preferably at least $13.0 \times 10^2$ mol/m$^3$ and preferably not more than $30.0 \times 10^2$ mol/m$^3$. The difference in crosslink density between the core center and the core surface, expressed as [(crosslink density at core surface)−(crosslink density at core center)], is preferably at least $9.0 \times 10^2$ mol/m$^3$ and preferably not more than $30.0 \times 10^2$ mol/m$^3$. When the crosslink density at the core center or the core surface falls outside of the above range, the water within the rubber composition may not fully contribute to decomposition of the organic peroxide during vulcanization, as a result of which a sufficient spin rate-lowering effect on the ball may not be obtained.

The crosslink density can be measured as follows.

A flat disk having a thickness of 2 mm is cut out by passing through the geometric center of the core. Using a die cutter, samples having a diameter of 3 mm are then die-cut from the flat disk at the core center and at places of measurement not more than 4 mm inward of respective sites corresponding to the core surface, and the sample weights are measured with an electronic balance capable of measuring to two decimal places (mg). The sample and 8 mL of toluene are placed in a 10 mL vial and the vial is closed with a stopper and left at rest for at least 72 hours, after which the solution is discarded and the sample weight following immersion is measured. The crosslink density of the rubber composition is calculated from the sample weights before and after swelling using the Flory-Rehner equation.

$$v=-(ln(1-v_r)+v_r+\chi v_r^2)/Vs(v_r^{1/3}-v_r/2)$$

Here, v is the crosslink density, yr is the volume fraction of rubber in the swollen sample, $\chi$ is an interaction coefficient, and Vs is the molar volume of toluene.

$$v_r=V_{BR}/(V_{BR}+V_T)$$

$$V_{BR}=(w_f-w_fv_f)/\rho$$

$$V_T=(w_s-w_f)/\rho_T$$

$V_{BR}$ represents the volume of butadiene rubber in the rubber composition, $V_T$ is the volume of toluene in the swollen sample, $v_f$ is the weight fraction of filler in the rubber composition, $\rho$ is the density of the rubber composition, $w_f$ is the sample weight before immersion, $w_s$ is the sample weight after immersion, and $\rho_T$ is the density of toluene.

Calculation is carried out at a Vs value of $0.1063\times10^{-3}$ m$^3$/mol and a $\rho_T$ value of 0.8669, and at a value for $\chi$, based on the literature (*Macromolecules* 2007, 40, 3669-3675), of 0.47.

The product P×E of the crosslink density difference P (mol/m$^3$) between the core surface and core center, expressed as [(crosslink density at core surface)−(crosslink density at core center)], multiplied by the deflection E (mm) of the core when compressed under a final load of 1,275 N (130 kgf) from an initial load of 98 N (10 kgf) has the following technical significance. Generally, as the core hardness becomes higher, i.e., as the core deflection E (mm) becomes smaller, the difference P (mol/m$^3$) in crosslink density tends to become larger. Therefore, by multiplying P by E in the above way, the influence of the core hardness can be canceled out, enabling the value P×E to serve as an indicator of the reduction in spin rate. The P×E value is preferably at least $26\times10^2$ mol/m$^3$ mm. As explained above, with the emergence of a difference in crosslink density between the core center and the core surface, a golf ball can be obtained which has a lower spin rate and a higher durability and moreover which, even with use over an extended period of time, does not undergo a decline in initial velocity.

Next, the method of measuring the dynamic viscoelasticity of the core is explained.

Generally, the viscoelasticity of a rubber material is known to have a strong influence on the performance of rubber products. Also, with regard to the loss tangent (tan $\delta$), which represents the ratio of energy lost to energy stored, it is known that a smaller tan $\delta$ is associated with a larger contribution by the elasticity component in rubber, and that a larger tan $\delta$ is associated with a larger contribution by the viscosity component. In this invention, in a dynamic viscoelasticity test on vulcanized rubber at the core center in which measurement is carried out at a temperature of −12° C. and a frequency of 15 Hz, letting tan $\delta_1$ be the loss tangent at a dynamic strain of 1% and tan $\delta_{10}$ be the loss tangent at a dynamic strain of 10%, the slope of these tan $\delta$ values, expressed as [(tan $\delta_{10}$−tan $\delta_1$)/(10−1%)], is preferably 0.003 or less, and more preferably 0.002 or less. When the above tan $\delta$ values become larger, the energy loss by the core may become too large, which may make it difficult to obtain a satisfactory rebound and a spin rate-lowering effect. Various methods may be employed to measure the dynamic viscoelasticity performance of the core. In one such method, a circular disk having a thickness of 2 mm is cut out of the cover-encased core by passing through the geometric center thereof, following which, with this as the sample, a die cutter is used to die-cut a 3 mm diameter specimen at the place of measurement. In addition, by employing a dynamic viscoelasticity measuring apparatus (such as that available under the product name EPLEXOR 500N from GABO) and using a compression test holder, the tan $\delta$ values under dynamic strains of 0.01 to 10% can be measured at an initial strain of 35%, a measurement temperature of −12° C. and a frequency of 15 Hz, and the slope determined based on the results of these measurements.

Figure 2:
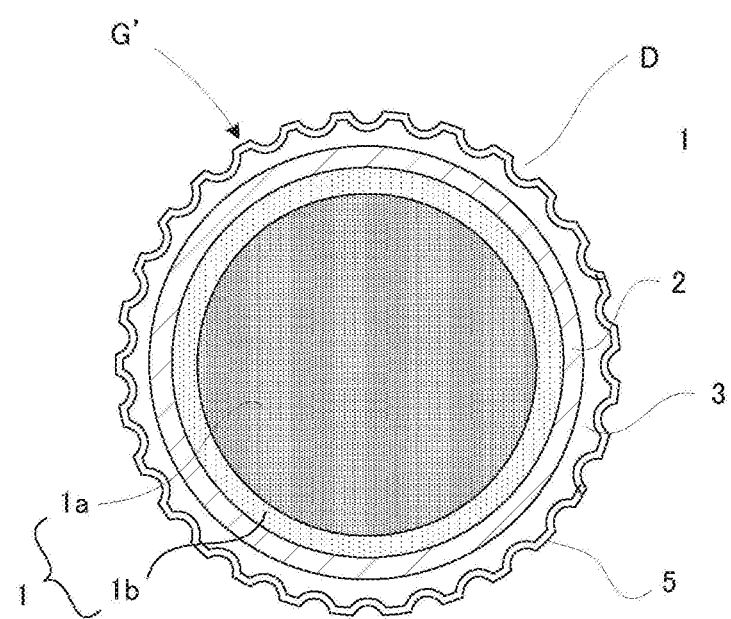
FIG. 2 is a schematic cross-sectional view of a golf ball according to another embodiment of the invention in which the core is formed as two layers.

In the golf ball of the invention, the core may be formed as a single layer or may be formed as two layers—an inner core layer and an outer core layer. For example, referring to FIG. 2, the golf ball G' may have a core 1 which is formed of an inner core layer 1*a* and an outer core layer 1*b*, an intermediate layer 2 and a cover 3 that cover the surface of the core, and a paint film layer 5 formed on the surface of the cover. As in FIG. 1, the reference symbol D represents dimples, a large number of which are formed on the surface of the cover 3.

When the core is formed into two layers—an inner core layer and an outer core layer, the inner core layer and outer core layer materials are each composed primarily of a rubber material. The rubber material for the outer core layer encasing the inner core layer may be of the same type as the inner core layer material or may be of a different type. The details are similar to those already given in connection with the ingredients making up the above-described core rubber material.

In cases where the core is formed as two layers, the diameter of the inner core layer is preferably at least 20 mm, more preferably at least 22 mm, and even more preferably at least 23 mm. The upper limit is preferably not more than 30 mm, more preferably not more than 28 mm, and even more preferably not more than 26 mm.

When the diameter of the inner core layer is too small, a ball spin rate-lowering effect may cease to be exhibited; when the diameter is too large, the initial velocity of the ball when hit decreases, as a result of which the intended distance may not be achieved.

The outer core layer has a thickness of preferably at least 1 mm, more preferably at least 3 mm, and even more preferably at least 5 mm. The upper limit is preferably not more than 12 mm, more preferably not more than 10 mm, and even more preferably not more than 8 mm. When the thickness of the outer core layer falls outside of the above range, a sufficient spin rate-suppressing effect on full shots may not be fully obtained and so a good distance may not be achieved.

The methods for producing the inner core layer and the outer core layer are not particularly limited. However, in accordance with customary practice, the inner core layer may be molded by a method such as that of forming the inner core layer material into a spherical shape under heating and compression at 140 to 180° C. for 10 to 60 minutes. The method used to form the outer core layer on the surface of the inner core layer may involve forming a pair of half-cups from unvulcanized rubber in sheet form, placing the inner core layer within these cups so as to encapsulate it, and then molding under applied heat and pressure. For example, suitable use can be made of a process which divides vulcanization into two stages wherein, following initial vulcanization (semi-vulcanization) to produce a pair of hemispherical cups, the prefabricated outer core layer-encased inner core layer is placed in one of the hemispherical cups and then covered with the other hemispherical cup, in which state secondary vulcanization (complete vulcanization) is carried out; or a process which renders an unvulcanized rubber composition into sheet form so as to produce a pair of outer core layer-forming sheets, stamps the sheets using a die provided thereon with a hemispherical protrusion to produce unvulcanized hemispherical cups, and subsequently covers a prefabricated inner core layer with a pair of these hemispherical cups and forms the whole into a spherical shape by heating and compression at 140 to 180° C. for 10 to 60 minutes.

Next, the intermediate layer is described.

The intermediate layer has a material hardness expressed in terms of Shore D hardness which, although not particularly limited, is preferably from 35 to 75, more preferably from 40 to 70. and even more preferably from 45 to 65. When the intermediate layer is too soft, the spin rate on full shots may rise excessively, as a result of which a good distance may not be achieved. On the other hand, when the intermediate layer is too hard, the feel of the ball on shots with a putter or on short approaches may become too hard.

The intermediate layer has a thickness of preferably from 0.9 to 2.4 mm, more preferably from 1.0 to 2.1 mm. and even more preferably from 1.1 to 1.8 mm. In this invention, it is preferable for the thickness of the intermediate layer to be larger than that of the subsequently described cover (outermost layer). When the intermediate layer thickness falls outside of this range or is smaller than the cover thickness, the spin rate-reducing effect on shots with a driver (W #1) may be inadequate, as a result of which a good distance may not be achieved.

The intermediate layer material is not particularly limited, although preferred use can be made of various thermoplastic resin materials. In particular, to fully achieve the desired effects of the invention, it is preferable to use a high-resilience resin material as the intermediate layer material. For example, the use of an ionomer resin material is preferred.

A commercial product may be used as the above resin. Illustrative examples include sodium-neutralized ionomer resins such as Himilan 1605, Himilan 1601 and AM7318 (all available from DuPont-Mitsui Polychemicals Co., Ltd.), and Surlyn 8120 (from E. I. DuPont de Nemours & Co.); zinc-neutralized ionomer resins such as Himilan 1557, Himilan 1706 and AM7317 (all available from DuPont-Mitsui Polychemicals Co., Ltd.); and the products available under the trade names HPF 1000, HPF 2000 and HPF AD1027, as well as the experimental material HPF SEP1264-3, all produced by E. I. DuPont de Nemours & Co. These may be used singly, or two or more may be used in combination.

A non-ionomeric thermoplastic elastomer may be included in the intermediate layer material. The non-ionomeric thermoplastic elastomer is preferably included in an amount of from 1 to 50 parts by weight per 100 parts by weight of the combined amount of the base resins.

The non-ionomeric thermoplastic elastomer is exemplified by polyolefin elastomers (including polyolefins and metallocene-catalyzed polyolefins), polystyrene elastomers, diene polymers, polyacrylate polymers, polyamide elastomers, polyurethane elastomers, polyester elastomers and polyacetals.

In addition, various additives may be optionally included in the intermediate layer-forming material. For example, pigments, dispersants, antioxidants, light stabilizers, ultraviolet absorbers, lubricants and the like may be suitably included.

It is advantageous to abrade the surface of the intermediate layer in order to increase adhesion with the polyurethane that is preferably used in the subsequently described cover (outermost layer). In addition, it is desirable to apply a primer (adhesive) to the surface of the intermediate layer following such abrasion treatment or to add an adhesion reinforcing agent to the intermediate layer material.

Also, an envelope layer may be formed between the core and the intermediate layer. The envelope layer material is exemplified by the same materials as those mentioned above for the intermediate layer material. The material used to form the envelope layer may be a resin material of the same type as or of a different type from the intermediate layer material.

The envelope layer thickness and material hardness may be suitably selected from the ranges given above for the intermediate layer thickness and material hardness.

When the core is formed into two layers—an inner core layer and an outer core layer, it is desirable to optimize the relationship between the surface hardness of the inner core layer and the surface hardness of the sphere obtained by encasing the core (meaning the entire core consisting of the inner core layer and the outer core layer) with the intermediate layer. That is, the JIS-C hardness value obtained by subtracting the surface hardness of the inner core layer from the surface hardness of the intermediate layer-encased sphere is preferably at least 25, more preferably at least 27, and even more preferably at least 29; the upper limit is preferably not more than 50, more preferably not more than 45, and even more preferably not more than 40. When this value is too small, a spin rate-lowering effect ceases to be exhibited and so the intended distance may not be obtained. When this value is too large, the durability may worsen.

Next, the cover, which is the outermost layer of the ball, is described.

The cover (outermost layer) has a material hardness expressed in terms of Shore D hardness which, although not particularly limited, is preferably from 25 to 57, more preferably from 27 to 55, and even more preferably from 29 to 53.

The cover (outermost layer) has a thickness which, although not particularly limited, is preferably from 0.3 to 1.5 mm, more preferably from 0.4 to 1.2 mm, and even more preferably from 0.5 to 1.0 mm. When the cover is thicker than this range, the rebound on W #1 shots and iron shots may be inadequate and the spin rate may rise, as a result of which a good distance may not be obtained. On the other hand, when the cover is thinner than this range, the ball may lack spin receptivity on approach shots, resulting in poor controllability.

The cover (outermost layer) material is not particularly limited, although the use of any of various thermoplastic resin materials or thermoset materials is preferred. For reasons having to do with controllability and scuff resistance, it is preferable to use a urethane resin as the cover material in this invention. In particular, from the standpoint of the mass productivity of manufactured golf balls, it is preferable to use a cover material composed primarily of polyurethane. This is described in detail below.

Polyurethane

The thermoplastic polyurethane material has a structure which includes soft segments composed of a polymeric polyol (polymeric glycol) that is a long-chain polyol, and hard segments composed of a chain extender and a polyisocyanate. Here, the polymeric polyol serving as a starting material is not subject to any particular limitation, and may be any that has hitherto been used in the art relating to thermoplastic polyurethane materials. Exemplary polymeric polyols include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. Illustrative examples of polyester polyols include adipate-based polyols such as polyethylene adipate glycol, polypropylene adipate glycol, polybutadiene adipate glycol and polyhexamethylene adipate glycol; and lactone-based polyols such as polycaprolactone polyol. Illustrative examples of polyether polyols include poly(ethylene glycol), poly(propylene glycol), poly(tetramethylene glycol) and poly(methyltetramethylene glycol). These may be used singly or as a combination of two or more thereof.

The number-average molecular weight of these long-chain polyols is preferably in the range of 1,000 to 5,000. By using a long-chain polyol having such a number-average molecular weight, golf balls made with a thermoplastic polyurethane composition having excellent properties such as the above-mentioned resilience and productivity can be reliably obtained. The number-average molecular weight of the long-chain polyol is more preferably in the range of 1,500 to 4,000, and even more preferably in the range of 1,700 to 3,500.

Here, and below, "number-average molecular weight" refers to the number-average molecular weight calculated based on the hydroxyl number measured in accordance with JIS K-1557.

The chain extender is not particularly limited, although preferred use can be made of ones that have hitherto been employed in the art relating to thermoplastic polyurethanes. A low-molecular-weight compound which has a molecular weight of 2,000 or less and bears on the molecule two or more active hydrogen atoms capable of reacting with isocyanate groups may be used, with the use of an aliphatic diol having from 2 to 12 carbons being preferred. Specific examples of the chain extender include 1,4-butylene glycol, 1,2-ethylene glycol, 1,3-butanediol, 1,6-hexanediol and 2,2-dimethyl-1,3-propanediol. Of these, the use of 1,4-butylene glycol is especially preferred.

The polyisocyanate is not subject to any particular limitation, although preferred use can be made of ones that have hitherto been employed in the art relating to thermoplastic polyurethanes. Illustrative examples include one or more selected from the group consisting of 4,4'-diphenylmethane diisocyanate, 2,4-toluene diisocyanate, 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate, 1,4-bis(isocyanatomethyl)cyclohexane and dimer acid diisocyanate. Depending on the type of isocyanate used, the cross-linking reaction during injection molding may be difficult to control.

Although not an essential ingredient, a thermoplastic resin or elastomer other than a thermoplastic polyurethane may also be included. More specifically, use may be made of one or more selected from among polyester elastomers, polyamide elastomers, ionomer resins, styrene block elastomers, hydrogenated styrene-butadiene rubbers, styrene-ethylene/butylene-ethylene block copolymers and modified forms thereof, ethylene-ethylene/butylene-ethylene block copolymers and modified forms thereof, styrene-ethylene/butylene-styrene block copolymers and modified forms thereof, ABS resins, polyacetals, polyethylenes and nylon resins. In particular, the use of polyester elastomers, polyamide elastomers and polyacetals is preferred because these increase the resilience and scuff resistance due to reaction with the isocyanate groups while yet maintaining a good productivity. When these ingredients are included, the content thereof is suitably selected so as to, for example, adjust the cover material hardness, improve the resilience, improve the flow properties or improve adhesion. The content of these ingredients, although not particularly limited, may be set to preferably at least 5 parts by weight per 100 parts by weight of the thermoplastic polyurethane component. Although there is no particular upper limit, the content per 100 parts by weight of the thermoplastic polyurethane component may be set to preferably not more than 100 parts by weight, more preferably not more than 75 parts by weight, and even more preferably not more than 50 parts by weight.

The ratio of active hydrogen atoms to isocyanate groups in the above polyurethane-forming reaction may be adjusted within a desirable range so as to make it possible to obtain golf balls which are made with a thermoplastic polyurethane composition and have various improved properties, such as rebound, spin performance, scuff resistance and productivity. Specifically, in preparing a thermoplastic polyurethane by reacting the above long-chain polyol, polyisocyanate compound and chain extender, it is desirable to use the respective components in proportions such that the amount of isocyanate groups included in the polyisocyanate compound per mole of active hydrogen atoms on the long-chain polyol and the chain extender is from 0.95 to 1.05 moles.

A commercial product may be suitably used as the above thermoplastic polyurethane material. Illustrative examples include the products available under the trade name "Pandex" from DIC Bayer Polymer, Ltd., and the products available under the trade name "Resamine" from Dainichiseika Color & Chemicals Mfg. Co., Ltd.

Treatment of Cover Surface

Next, in the golf ball of the invention, the surface of the outermost cover layer molded as described above may be treated with a polyisocyanate compound that is free of organic solvent. The method of carrying out this surface treatment is described below.

This treatment method uses a polyisocyanate compound that is free of organic solvent. The polyisocyanate compound, although not particularly limited, is selected from the following group.

<Group of Polyisocyanate Compounds>

The group consisting of tolylene-2,6-diisocyanate, tolylene-2,4-diisocyanate, 4,4'-diphenylmethane diisocyanate, polymethylene polyphenyl polyisocyanate, 1,5-diisocyanatonaphthalene, isophorone diisocyanate (including isomer mixtures), dicyclohexylmethane-4,4'-diisocyanate, hexamethylene-1,6-diisocyanate, m-xylylene diisocyanate, hydrogenated xylylene diisocyanate, tolidine diisocyanate, norbornene diisocyanate, derivatives of these, and prepolymers formed of such polyisocyanate compounds.

The polyisocyanate compound is preferably an aromatic polyisocyanate, with the use of 4,4'-diphenylmethane diisocyanate (monomeric(i.e., pure) MDI) or polymethylene polyphenyl polyisocyanate (polymeric MDI) being especially preferred. When an aromatic polyisocyanate is used in the invention, because it has a high reactivity with the reactive groups on the thermoplastic resin, the intended effects can be successfully achieved. The use of polymeric MDI is preferred because it has a larger number of isocyanate groups than monomeric MDI and thus provides a large scuff resistance-improving effect due to crosslink formation, and moreover because it is in a liquid state at normal temperatures and thus has an excellent handleability. However, polymeric MDI generally has a dark brown appearance, which may discolor and stain the cover material to be treated. Because such discoloration is conspicuous when treatment is carried out with a solution of polymeric MDI dissolved in an organic solvent, owing to concern over such discoloration, it is preferable to use the polymeric MDI in an organic solvent-free state.

The preliminary treatments described in, for example, JP 4114198 and JP 4247735 may be suitably used as methods for reducing discoloration by polymeric MDI. Although the techniques described in these patent publications may be adopted for use here, the possibilities are not limited to these techniques alone. When such preliminary treatment is carried out and the treatment is followed by suitable washing, substantially no discoloration arises.

Dipping, coating (spraying), infiltration under applied heat and pressure, dropwise addition or the like may be suitably used as the method of treatment with the polyisocyanate compound. In particular, from the standpoint of process control and productivity, the use of a dipping or coating method is preferred. The length of treatment by dipping is preferably from 1 to 180 minutes. When the treatment time is too short, a sufficient crosslinking effect is difficult to obtain. On the other hand, when the treatment time is too long, there is a possibility of substantial discoloration of the cover surface by excess polyisocyanate compound. Also, th a long treatment time, the production lead time becomes long, which is rather undesirable from the standpoint of productivity. As for the temperature during such treatment, from the standpoint of productivity, it is preferable to control the temperature within a range that allows a stable molten liquid state to be maintained and also allows the reactivity to be stably maintained. The temperature is preferably from 10 to 60° C. If the treatment temperature is too low, infiltration and diffusion to the cover material or reactivity at the surface layer interface may be inadequate, as a result of which the desired properties may not be achieved. On the other hand, if the treatment temperature is too high, infiltration and diffusion to the cover material or reactivity at the surface layer interface may increase and there is a possibility of greater discoloration of the cover surface on account of excess polyisocyanate compound. Also, in cases where the ball appearance—including the shapes of the dimples—changes, or an ionomeric material is used in part of the golf ball, this may give rise to changes in the physical properties of the ball. By carrying out treatment for a length of time and at a temperature in these preferred ranges, it is possible to obtain a sufficient crosslinking effect and, in turn, to achieve the desired ball properties without a loss of productivity.

When excess polyisocyanate compound remains on the ball surface following the above treatment, this tends to cause adverse effects such as logo mark transfer defects and the peeling of paint, and moreover may lead to appearance defects such as discoloration over time. Hence, it is preferable to wash the ball surface with a suitable organic solvent. Particularly in cases Where polymeric MDI is used, because this compound is a dark brown-colored liquid, unless the ball surface is thoroughly washed, appearance defects may end up arising. The organic solvent used at this time should be suitably selected from among appropriate organic solvents that dissolve the polyisocyanate compound and do not dissolve the polyurethane serving as a component of the cover material. Preferred use can be made of organic solvents such as esters and ketones, as well as solvents such as benzene, dioxane and carbon tetrachloride which dissolve the polyisocyanate compound. In particular, acetone, ethyl acetate, methyl ethyl ketone, methyl isobutyl ketone, toluene and xylene, either alone or in admixture, may be suitably used as the organic solvent, although the choices are not necessarily limited to these. Washing with the organic solvent may be carried out by an ordinary method. For example, use may be made of dipping, shaking, ultrasound, microbubbles or nanobubbles, a submerged jet or a shower.

Drying treatment may be carried out preliminary to surface treatment with the polyisocyanate compound. That is, when treating the cover, in order to remove moisture contained in the cover material and thereby stabilize the physical properties following treatment as well as extend the life of the treatment solution, it may be desirable to carry out, as needed, drying treatment or the like beforehand, although this is not always the case. A common method such as warm-air drying or vacuum drying may be used as the drying treatment.

Following surface treatment with the polyisocyanate compound, it is desirable to provide a suitable curing step in order both to have the crosslinking reactions between the polyurethane material and the polyisocyanate compound effectively proceed, thereby enhancing and stabilizing the physical properties and quality, and also to control and shorten the production takt time. Specifically, it is preferable to carry out heating treatment under suitable temperature and time conditions that are typically from 15 to 150° C. for up to 24 hours.

The pickup of polyisocyanate compound following surface treatment can be suitably adjusted according to the weight and desired properties of the golf ball as a whole. This pickup, expressed in terms of weight change, is preferably in the range of 0.01 to 1.0 g. When the weight change is too small, impregnation by the polyisocyanate compound may be inadequate and suitable property enhancing effects may not be obtained. When the weight change is too large, the control of various parameters, including control of the ball weight within a range that conforms to the rules for golf balls and dimple changes, may be difficult. With regard to the depth of impregnation by the polyisocyanate compound, the process conditions may be suitably selected so as to obtain the desired physical properties. Given that the polyisocyanate compound penetrates and disperses from the surface, modification by this method has the advantageous effect of making it easy to impart a gradient in the physical properties. Imparting a physical property gradient within a cover layer having some degree of thickness simulates, and indeed serves the same purpose as, providing a cover layer that is itself composed of multiple layers, thus making it possible to achieve cover characteristics that never before existed. The state of impregnation by the polyisocyanate compound may vary depending on whether an organic solvent is present. When an organic solvent is used, changes in the physical properties can be achieved to a greater depth; when an organic solvent is not used, changes in the physical properties are easily imparted at positions closer to the interface. When treatment is carried out by a method that does not use an organic solvent, the physical properties near the surface of the outermost cover layer and the physical properties at the cover interior are easily differentiated, which has the advantage of enabling a greater degree of freedom in golf ball design to be achieved.

In addition, various additives may be optionally included in the cover resin material. For example, pigments, dispersants, antioxidants, light stabilizers, ultraviolet absorbers, lubricants and the like may be suitably included.

The manufacture of multi-piece solid golf balls in which the above-described core, intermediate layer and cover (outermost layer) are formed as successive layers may be carried out by a customary method such as a known injection-molding process. For example, a multi-piece golf ball can be obtained by placing, as the core, a vulcanized product composed primarily of a rubber material in a given injection mold, injecting an intermediate layer-forming material over the core to give an intermediate sphere, and subsequently placing the resulting sphere in another injection mold and injection-molding a cover (outermost layer)-forming material over the sphere. Alternatively, a cover can be formed over the intermediate layer by a method that involves encasing the intermediate sphere with a cover (outermost layer), this being carried out by, for example, enclosing the intermediate sphere within two half-cups that have been pre-molded into hemispherical shapes, and then molding under applied heat and pressure.

In the golf ball of the invention, for reasons having to do with aerodynamic performance, numerous dimples may be provided on the surface of the outermost layer. The number of dimples formed on the surface of the outermost layer is not particularly limited. However, to enhance the aerodynamic performance and increase the distance traveled by the ball, this number is preferably at least 250, more preferably at least 270, even more preferably at least 290, and most preferably at least 300. The upper limit is preferably not more than 400, more preferably not more than 380, and even more preferably not more than 360.

In this invention, a paint film layer is formed on the cover surface. A two-part curable urethane paint may be suitably used as the paint that forms the paint film layer. Specifically, in this case, the two-part curable urethane paint includes a base resin composed primarily of a polyol resin and a curing agent composed primarily of a polyisocyanate.

A known method may be used without particular limitation as the method of applying this paint onto the cover surface and forming a paint film layer. Use can be made of a desired method such as air gun painting or electrostatic painting.

The thickness of the paint film layer, although not particularly limited, is generally from 8 to 22 μm, and preferably from 10 to 20 μm.

The paint film layer has an elastic work recovery of preferably from 30 to 98%, and more preferably from 70 to 90%. When the elastic work recovery of the paint film layer is within the above range, the paint film formed on the golf ball surface has a high self-repairing ability while maintaining a certain hardness and elasticity and is thus able to contribute to excellent ball durability and scuff resistance. When the elastic work recovery of this paint film layer falls outside of the above range, a sufficient spin rate on approach shots may not be attainable. The method of measuring this elastic work recovery is subsequently described.

The elastic work recovery is one parameter of the nanoindentation method for evaluating the physical properties of paint films, which is a nanohardness test method that controls the indentation load on a micro-newton (μN) order and tracks the indenter depth during indentation to a nanometer (nm) precision. In prior methods, only the size of the deformation (plastic deformation) mark corresponding to the maximum load could be measured. However, in the nanoindentation method, the relationship between the indentation load and the indentation depth can be obtained by continuous automated measurement. Hence, unlike in the past, there are no individual differences between observers when visually measuring a deformation mark under an optical microscope, which presumably enables the physical properties of the paint film to be measured reliably and to a high precision. Hence, given that the paint film on the golf ball surface is strongly affected by the impact of drivers and various other clubs and has a not inconsiderable influence on various golf ball properties, measuring the golf ball paint film by the nanohardness test method and carrying out such measurement to a higher precision than in the past is a very effective method of evaluation.

The golf ball with a paint film layer thus formed on the cover surface has a dynamic coefficient of friction of preferably from 0.300 to 0.430, and more preferably from 0.350 to 0.400. The dynamic coefficient of friction here is the coefficient of friction between the golf ball and an impact plate sloped at a given angle when the ball is made to collide with the plate, and is measured with a contact force tester. For a detailed explanation of this contact force tester, reference can be made to the substantially identical tester described in JP-A 2013-176530, in this invention, the dynamic coefficient of friction is measured by dropping the ball from a height of 90 cm and causing it to collide with the impact plate at an angle of 20°. The angle at which the ball is made to collide with the impact plate is set to 20° in order to represent an open face on an iron club used on an approach shot.

The dynamic coefficient of friction is calculated from the following formula.

Dynamic coefficient of friction=contact force (shear direction)/contact force (launch direction)

The spin rate on an approach shot is closely associated with the cover hardness and the paint film hardness, and also is strongly correlated with the dynamic coefficient of friction of the golf ball. Hence, to obtain the optimal spin rate on an approach shot, as will be explained later in this Specification, it is essential to optimize a spin index that is based on the dynamic coefficient of friction for the golf ball.

In this invention, letting (Ho−H10)−(H10−Hc) of above formula (3)' in the core hardness profile be A', the spin index of the ball, defined as the dynamic coefficient of friction for the ball multiplied by A', must be at least 3.0. By making this spin index larger than 3.0, it is possible both to reduce the spin rate on full shots with a driver (W #1) and also to achieve a suitable spin rate on approach shots. The spin index is preferably 3.1 or more, and more preferably 3.2 or more.

The technical significance of multiplying the dynamic coefficient of friction for the ball by A' lies in providing an indicator of the degree to which the contradictory attributes of increased distance performance due to a reduced spin rate on full shots and increased control performance on approach shots can both be attained, thus helping to achieve the desired effect in this invention of improving the overall performance over that of conventional golf balls.

The inventive golf ball has a diameter of preferably at least 42 mm, more preferably at least 42.3 mm, and even more preferably at least 42.6 mm. The upper limit is preferably not more than 44 mm, more preferably not more than 43.8 mm, even more preferably not more than 43.5 mm, and still more preferably not more than 43 mm.

The golf ball has a weight of preferably at least 44.5 g, more preferably at least 44.7 g, even more preferably at least 45.1 g, and most preferably at least 45.2 g. The upper limit is preferably not more than 47.0 g, more preferably not more than 46.5 g, and even more preferably not more than 46.0 g.

The deflection of the golf ball under an applied load, that is, the deflection of the ball. when compressed under a final load of 1,275 N (130 kgf) from an initial load of 98 N (10 kgf), has a lower limit of preferably at least 1.8 mm, more preferably at least 2.0 mm, and even more preferably at least 2.2 mm. The upper limit is preferably not more than 3.8 mm, more preferably not more than 3.6 mm, and even more preferably not more than 3.4 mm. When the ball deflection is too small, the feel at impact may worsen markedly or the spin rate may rise excessively, as a result of which the desired distance may not be achieved. Conversely, when the deflection is too large, the initial velocity may be poor or the durability may be greatly compromised.

It should be noted that the deflection of the golf ball under a given applied load refers here to the measured deflection for a completed golf ball having a paint film layer formed on the surface of the cover (outermost layer).

As described above, the golf ball of the invention suppresses the spin rate on full shots and thus has an ability to maintain a straight trajectory, and moreover exhibits a satisfactory spin performance on approach shots. The performance is thus enhanced over that of conventional golf balls, enabling the inventive ball to satisfy at a high level the distance and control performances relied on by professional golfers and skilled amateurs.

EXAMPLES

The following Working Examples and Comparative Examples are provided to illustrate the invention, and are not intended to limit the scope thereof.

Working Examples 1 to 4, Comparative Example 1

Formation of Core

Solid cores were produced by preparing the rubber compositions for the respective Working Examples and Comparative Examples shown in Table 1, then vulcanizing/molding to the compositions under the vulcanization conditions shown in Table 1.

TABLE 1

| Core formulations (pbw) | Working Example | | | | Comparative Example 1 |
|---|---|---|---|---|---|
| | 1 | 2 | 3 | 4 | |
| Polybutadiene (1) | 80 | 80 | 80 | 80 | 80 |
| Polybutadiene (2) | 20 | 20 | 20 | 20 | 20 |
| Zinc acrylate | 37.5 | 57.5 | 34 | 34 | 35 |
| Organic peroxide (1) | 0.5 | 0.5 | 1.0 | 1.0 | |
| Organic peroxide (2) | | | | | 1.2 |
| Antioxidant (1) | | | 0.1 | 0.1 | 0.1 |
| Antioxidant (2) | 0.5 | 0.5 | | | |
| Barium sulfate | | | | | 12 |
| Zinc oxide | 14.6 | 6 | 17.7 | 17.7 | 4 |
| Zinc salt of pentachlorothiophenol | 0.4 | 0.4 | 0.4 | 0.4 | 0.1 |

TABLE 1-continued

| Core formulations (pbw) | Working Example | | | | Comparative Example 1 |
|---|---|---|---|---|---|
| | 1 | 2 | 3 | 4 | |
| Propylene glycol | 1.5 | 5.0 | | | |
| Glycerol | | | 1.0 | | |
| Ethylene glycol | | | | 1.0 | |
| Vulcanization temperature (° C.) | 152 | 152 | 155 | 155 | 155 |
| Vulcanization time (min) | 19 | 19 | 20 | 20 | 13 |

Details on the ingredients in Table 1 are given below.
Polybutadiene (1): Available under the trade name "BR01" from JSR Corporation
Polybutadiene (2): Available under the trade name "BR51" from JSR Corporation
Organic peroxide (1): Dicumyl peroxide, available under the trade name "Percumyl D" from NOF Corporation
Organic peroxide (2): A mixture of 1,1-di(t-butylperoxy)cyclohexane and silica, available under the trade name "Perhexa C-40" from NOF Corporation
Antioxidant (1): Available under the trade name "Nocrac NS-6" from Ouchi Shinko Chemical Industry Co., Ltd.
Antioxidant (2): Available under the trade name "Nocrac MB" from Ouchi Shinko Chemical Industry Co., Ltd.
Barium sulfate: Available under the trade name "Precipitated Barium Sulfate #300" from Sakai Chemical Co., Ltd.
Zinc oxide: Available under the trade name "Zinc Oxide Grade 3" from Sakai Chemical Co., Ltd.
Zinc salt of pentachlorothiophenol:
  Available from Wako Pure Chemical Industries, Ltd.
Propylene glycol (a lower dihydric alcohol):
  molecular weight, 76.1 (from Hayashi Pure Chemical Ind., Ltd.)
Glycerol (a lower trihydric alcohol):
  molecular weight, 92.1 (from Hayashi Pure Chemical Ind., Ltd.)
Ethylene glycol (a lower dihydric alcohol):
  molecular weight, 62.1 (from Hayashi Pure Chemical Ind., Ltd.)

Formation of Intermediate Layer and Cover (Outermost Layer)

Next, in Working Examples 1 to 4 and Comparative Example 1, an intermediate laye was formed over the core by injection-molding an intermediate layer material formulated as shown under II in Table 2 below, thereby giving an intermediate layer-encased sphere. A cover (outermost layer) was then formed over the resulting intermediate layer-encased sphere by injection-molding a cover material formulated as shown under VIII in Table 2 below. At this time, a plurality of dimples in a specific configuration common to all of the Working Examples and the Comparative Example was formed on the cover surface.

TABLE 2

| Resin formulation (pbw) | II | VIII |
|---|---|---|
| Himilan 1605 | 50 | |
| Himilan 1557 | 15 | |
| Himilan 1706 | 35 | |
| Trimethylolpropane | 1.1 | |
| T-8290 | | 75 |
| T-8283 | | 25 |
| Hytrel 4001 | | 11 |
| Silicone wax | | 0.6 |

TABLE 2-continued

| Resin formulation (pbw) | II | VIII |
|---|---|---|
| Polyethylene wax |  | 1.2 |
| Isocyanate compound |  | 7.5 |
| Titanium oxide |  | 3.9 |

Details on the materials shown in Table 2 are as follows.
Himilan 1605, Himilan 1557 and Himilan 1706:
  Ionomers available from Dow-Mitsui Polychemicals Co., Ltd.
Trimethylolpropane: Available from Mitsubishi Gas Chemical Co, Inc.
T-8290, T-8283: Ether-type thermoplastic polyurethanes available from DIC Covestro Polymer, Ltd. under the trademark Pandex
Hytrel 4001: A polyester elastomer available from DuPont-Toray Co., Ltd.
Polyethylene wax: Available under the trade name "Sanwax 161P" from Sanyo Chemical Industries, Ltd.
Isocyanate compound: 4,4'-Diphenylmethane diisocyanate
Titanium oxide: Tipaque R680, from Ishihara Sangyo Kaisha, Ltd.
Formation of Paint Film Layer
  Next, Paint Formulation "A" shown in Table 3 below was applied with an air spray gun onto the cover (outermost layer) surface on which numerous dimples had been formed, thereby producing a golf ball having a 15 μm-thick paint film layer formed thereon.

TABLE 3

| | Paint formulation (pbw) | A |
|---|---|---|
| Base resin | Polyol *1 | 100.0 |
| | Ethyl acetate | 60.0 |
| | Propylene glycol monomethyl ether acetate | 40.0 |
| | Curing catalyst | 0.03 |
| Curing agent | Isocyanurate form of hexamethylene diisocyanate | 52.5 |
| | Ethyl acetate | 47.5 |
| | Molar compounding ratio (NCO/OH) | 1.08 |

A Synthesis Example for the acrylic Polyol*1 in Table 3 is described below. Here, "parts" signifies parts by weight.
[Acrylic Polyol Synthesis Example 1]
  A reactor equipped with a stirrer, a thermometer, a condenser, a nitrogen gas inlet and a dropping device was charged with 1,000 parts of butyl acetate and the temperature was raised to 100° C. under stirring. Next, a mixture consisting of 620 parts of polyester-containing acrylic monomer (Placcel FM-3, from Daicel Chemical Industries, Ltd.; 317 parts of methyl methacrylate, 63 parts of 2-hydroxyethyl methacrylate and 12 parts of 2,2'-azobisisobutyronitrile was added dropwise over 4 hours. After the end of dropwise addition, the reaction was effected for 6 hours at the same temperature. Following reaction completion, 532 parts of butyl acetate and 520 parts of polycaprolactone diol (Placcel L205AL, from Daicel Chemical Industries, Ltd.) were charged and mixed in, giving a clear acrylic polyol resin solution (Polyol*1) having a solids content of 50%, a viscosity of 600 mPa·s (25° C.), a weight-average molecular weight of 70,000 and a hydroxyl value of 142 mgKOH/g (solids).
  The following measurements and evaluations were carried out on the golf balls thus obtained. The results are shown in Table 4.

Diameters of Core and intermediate Layer-Encased Sphere
  The diameters at five random places on the surface were measured at a temperature of 23.9±1° C. and, using the average of these measurements as the measured value for a single core or intermediate layer-encased sphere, the average diameters for five measured cores or intermediate layer-encased spheres were determined.
Ball Diameter
  The diameter at five random dimple-free areas was measured at a temperature of 23.9±1° C. and, using the average of these measurements as the measured value for a single ball, the average diameter for five balls was determined.
Core and Ball Deflection
  A core or ball was placed on a hard plate and the amount of deflection (mm) of each sphere when compressed under a final load of 1,275 N (130 kgf) from an initial load of 98 N (10 kgf) was measured. The amount of deflection refers in each case to the measured value obtained after holding the test specimen isothermally at 23.9° C.
Core Hardness Profile
  The indenter of a durometer was set so as to be substantially perpendicular to the spherical surface of the core, and the core surface hardness in terms of JIS-C hardness was measured as specified in JIS K6301-1975.
  To obtain the cross-sectional hardnesses at the center and other specific positions of the core, the core was hemispherically cut so as form a planar cross-section and measurements were carried out by pressing the indenter of a durometer perpendicularly against the cross-section at the measurement positions. These hardnesses are indicated as JIS-C hardness values.
Material Hardnesses of intermediate Layer and Cover (Shore D Hardnesses)
  The intermediate layer and cover-forming resin materials were molded into sheets having a thickness of 2 mm and left to stand for at least two weeks, following which their Shore D hardnesses were measured in accordance with ASTM D2240-95.
Elastic Work Recovery of Paint Film Layer
  The elastic work recovery of the paint was measured using a paint film sheet having a thickness of 100 μm. The ENT-2100 nanohardness tester from Erionix Inc. was used as the measurement apparatus, and the measurement conditions were as follows.
  Indenter: Berkovich indenter (material: diamond; angle α: 65.03°)
  Load F: 0.2 mN
  Loading time: 10 seconds
  Holding time: 1 second
  Unloading time: 1 second
  The elastic work recovery was calculated as follows based on the indentation work $W_{elast}$ (Nm) due to spring-back deformation of the paint film, and on the mechanical indentation work $W_{total}$ (Nm), Elastic work recovery=$W_{elast}/W_{total}$×100 (%)

Dynamic Coefficient of Friction for Ball
  The dynamic coefficient of friction for the ball was measured using an apparatus to that is substantially the same as the contact force tester described in JP-A 2013-176530.
(I) Measurement Apparatus Specifications
  (A) Launcher: Drops ball from a specified height (90 cm in this case)
  (B) Impact Plate: Constructed of a base plate, a surface layer plate and a pressure sensor. The base plate is made of steel and has a thickness of 15 mm. The surface layer plate is made of stainless steel (SUS-630) and is 80 mm×80 mm×20 mm in size. The surface layer material which is positioned on the outside of the surface layer plate and serves as the striking surface of the impact plate is made of a titanium alloy, is not grooved, and has an average roughness Ra of 0.146 μm and a maximum height Ry of 1.132 μm. A Kistler 3-component sensor (model 9067 force sensor) was used as the pressure sensor. A Kistler type 5011B charge amplifier was used.

The slope angle (angle of impact plate with respect to dropping direction) was 20°.

(II) Measurement Procedure

Measurement of the dynamic coefficient of friction was carried out by the following procedure.

(II-a) The angle (α) of the impact plate is set to 20° (angle of impact plate with respect to dropping direction).
(II-b) The golf ball is dropped from the launcher.
(II-c) The launch direction contact force Fn (t) and the shear direction contact force Ft (t) are measured, and the maximum value of Ft (t)/Fn (t) is calculated.

Spin Index of Ball

The spin index shown in Table 4 is defined as the value calculated by multiplying (3)' "Hardness difference (2)'-Hardness difference (1)'", i.e., the (Ho–H10)–(H10–Hc) value, in the core hardness profile in Table 4 by the dynamic coefficient of friction for the ball determined as described above.

The flight performance (W #1) and spin performance on approach shots of the golf balls obtained in the respective Working Examples and Comparative Examples were evaluated according to the criteria shown below. The results are presented in Table 5.

Initial Velocity

The initial velocity was measured using an initial velocity measuring apparatus of the same type as the USGA drum rotation-type initial velocity instrument approved by the R&A. The ball was tested in a chamber at a room temperature of 23.9±2° C. after being held isothermally in a 23.9±1° C. environment for at least 3 hours. Each ball was hit using a 250-pound (113.4 kg) head (striking mass) at an impact velocity of 143.8 ft/s (43.83 m/s). One dozen balls were each hit four times. The time taken for the ball to traverse a distance of 6.28 ft (1.91 m) was measured and used to compute the initial velocity (m/s). This cycle was carried out over a period of about 15 minutes.

Flight Performance

The distance traveled by the ball when struck at a head speed (HS) of 50 m/s with a driver (W #1) mounted on a golf swing robot was measured, and the flight performance was rated according to the following criteria. The club used was the TourStage X-Drive 709 D430 driver (2013 model) manufactured by Bridgestone Sports Co., Ltd. The loft angle on this driver was 9.5°. The spin rate was measured using the Science Eye Field launch monitor system manufactured by Bridgestone Sports Co., Ltd.

[Evaluation Criteria]

Good: Total distance was 264 m or more
NG: Total distance was less than 264 m

Spin Performance on Approach Shots

The spin rate of the golf ball was measured with an imaging device at the same time as measurement of the dynamic coefficient of friction described above. That is, as described above under "Dynamic Coefficient of Friction for Ball," the ball was dropped from a height of 90 cm onto an impact plate and the spin rate following impact was measured. The spin rate was rated according to the following criteria. The initial velocity of the ball following impact was about 3.5 to 4.5 m/s, which corresponds to the general club head speed for obtaining a distance of 6 to 7 yards on an approach shot with a sand wedge.

[Evaluation Criteria]

Good: Spin rate was 1,200 rpm or more
NG: Spin rate was less than 1,200 rpm

TABLE 4

| | | Working Example | | | | Comp. |
|---|---|---|---|---|---|---|
| | | 1 | 2 | 3 | 4 | Example 1 |
| | Ball construction | single-layer core/ 2-layer cover | single-layer core/ 2-layer cover | single-layer core/ 2-layer cover | single-layer core/ 2-layer cover | single-layer core/ 2-layer cover |
| Ball | Dynamic coefficient of friction | 0.31 | 0.31 | 0.31 | 0.31 | 0.31 |
| | Deflection (mm) | 2.4 | 2.5 | 2.3 | 2.4 | 2.4 |
| Paint film | Formulation | A | A | A | A | A |
| | Elastic work recovery (%) | 80.1 | 80.1 | 80.1 | 80.1 | 80.1 |
| | Thickness (μm) | 15 | 15 | 15 | 15 | 15 |
| Cover | Material | VIII | VIII | VIII | VIII | VIII |
| | Thickness (mm) | 0.8 | 0.8 | 0.8 | 0.8 | 0.8 |
| | Material hardness (Shore D) | 47 | 47 | 47 | 47 | 47 |
| Intermediate layer | Material | II | II | II | II | II |
| | Thickness (mm) | 1.2 | 1.2 | 1.2 | 1.2 | 1.2 |
| | Material hardness (Shore D) | 64 | 64 | 64 | 64 | 64 |
| Inter-mediate layer-encased sphere | Surface hardness (JIS-C) | 98 | 98 | 98 | 98 | 98 |
| Core | Diameter (mm) | 38.65 | 38.65 | 38.65 | 38.65 | 38.65 |
| | Deflection (mm) | 3.0 | 3.1 | 2.9 | 3.0 | 3.0 |
| | Hardness profile (JIS-C) Center (Hc) | 61 | 57 | 60 | 60 | 64 |
| | 2 mm from center | 63 | 58 | 63 | 62 | 67 |
| | 4 mm from center | 65 | 59 | 64 | 64 | 68 |
| | 6 mm from center | 66 | 60 | 66 | 66 | 70 |
| | 8 mm from center | 67 | 67 | 67 | 67 | 71 |
| | 10 mm from center (H10) | 69 | 68 | 69 | 68 | 71 |
| | 12 mm from center (H12) | 73 | 73 | 73 | 73 | 71 |
| | 14 mm from center | 81 | 81 | 81 | 80 | 72 |

TABLE 4-continued

|  | Working Example | | | | Comp. |
|---|---|---|---|---|---|
|  | 1 | 2 | 3 | 4 | Example 1 |
| Ball construction | single-layer core/ 2-layer cover | single-layer core/ 2-layer cover | single-layer core/ 2-layer cover | single-layer core/ 2-layer cover | single-layer core/ 2-layer cover |
| 16 mm from center | 85 | 85 | 84 | 84 | 77 |
| 18 mm from center | 88 | 88 | 87 | 87 | 77 |
| Surface (Ho) | 89 | 89 | 89 | 87 | 81 |
| (1)' Hardness difference H10 − Hc | 8 | 11 | 8 | 8 | 7 |
| (2)' Hardness difference Ho − H10 | 20 | 21 | 20 | 19 | 10 |
| (3)' Hardness difference (2)' − (1)' | 12 | 10 | 12 | 11 | 3 |
| (1) Hardness difference H12 − Hc | 12 | 16 | 12 | 12 | 6 |
| (2) Hardness difference Ho − H12 | 16 | 16 | 16 | 15 | 10 |
| (3) Hardness difference (2) − (1) | 4 | 1 | 4 | 3 | 4 |
| (4) Hardness difference Ho − Hc | 28 | 32 | 28 | 27 | 16 |
| Hardness profile index: (3)' × Core deflection | 36 | 31 | 34 | 34 | 8 |
| Spin index: (3)' × Dynamic coefficient of friction | 3.6 | 3.1 | 3.6 | 3.5 | 0.9 |
| Hardness relationship: Intermediate layer surface − Core surface (JIS-C) | 9 | 9 | 9 | 11 | 18 |

TABLE 5

|  |  | Working Example | | | | Comp. |
|---|---|---|---|---|---|---|
|  |  | 1 | 2 | 3 | 4 | Example 1 |
| Flight (W#1; HS, 50 m/s) | Initial velocity (m/s) | 72 | 72 | 72 | 72 | 72 |
|  | Spin rate (rpm) | 2,275 | 2,233 | 2,316 | 2,299 | 2,475 |
|  | Distance (m) | 265.5 | 265.1 | 266.0 | 265.8 | 258.0 |
|  | Rating | Good | Good | Good | Good | NG |
| Spin performance on approach shots (SW) | Spin rate (rpm) | 1,361 | 1,350 | 1,371 | 1,367 | 1,360 |
|  | Rating | Good | Good | Good | Good | Good |

The following was apparent from the test results in Table 5.

In Comparative Example 1, the formula (4) "Ho−Hc" value in the core hardness profile was small and the core formulation did not include component (d). As a result, the spin rate on shots with a W #1 increased, resulting in a poor flight performance.

Working Examples 5 to 13. Comparative Example 2 to 4

Formation of Core

Solid cores were produced by preparing the rubber compositions for the respective Working Examples and Comparative Examples shown in Table 6, then vulcanizing/molding the compositions at a vulcanization temperature of 153° C. for a vulcanization time of 15 minutes.

TABLE 6

|  | Working Example | | | | | | | | | Comparative Example | | |
|---|---|---|---|---|---|---|---|---|---|---|---|---|
| Core formulations (pbw) | 5 | 6 | 7 | 8 | 9 | 10 | 11 | 12 | 13 | 2 | 3 | 4 |
| Polybutadiene (1) | 100 | 100 | 100 | 100 | 100 | 100 | 100 | 100 | 100 | 100 | 100 | 100 |
| Zinc acrylate | 34 | 34 | 34 | 34 | 34 | 34 | 34 | 34 | 33 | 29 | 32 | 32 |
| Organic peroxide (1) | 1 | 1 | 1 | 1 | 1 | 1 | 1 | 1 | 1 | 1 | 1 | 1 |
| Antioxidant (1) | 0.1 | 0.1 | 0.1 | 0.1 | 0.1 | 0.1 | 0.1 | 0.1 | 0.1 | 0.1 | 0.1 | 0.1 |
| Zinc oxide | 17.7 | 17.7 | 17.7 | 17.7 | 17.7 | 17.7 | 17.7 | 17.7 | 18.4 | 19.6 | 20.9 | 20.9 |
| Zinc salt of pentachlorothiophenol | 0.5 | 0.5 | 0.5 | 0.5 | 0.5 | 0.5 | 0.5 | 0.5 | 0 | 0.5 | 0.5 | 0.5 |
| Propylene glycol | 1 |  |  |  |  |  |  |  | 1 |  |  |  |
| Glycerol |  | 1 |  |  |  |  |  |  |  |  |  |  |
| 1,2,4-Butanetriol |  |  | 1 |  |  |  |  |  |  |  |  |  |
| Trimethylolpropane |  |  |  | 1 |  |  |  |  |  |  |  |  |
| Di(trimethylolpropane) |  |  |  |  | 1 |  |  |  |  |  |  |  |
| Trimethylolethane |  |  |  |  |  | 1 |  |  |  |  |  |  |
| Pentaerythritol |  |  |  |  |  |  | 1 |  |  |  |  |  |
| Sorbitol |  |  |  |  |  |  |  | 1 |  |  |  |  |
| Stearyl alcohol |  |  |  |  |  |  |  |  |  |  | 5 |  |
| Polyethylene glycol |  |  |  |  |  |  |  |  |  |  |  | 5 |

TABLE 6-continued

|  |  | Working Example | | | | | | | | | Comparative Example | | |
|---|---|---|---|---|---|---|---|---|---|---|---|---|---|
| Core formulations (pbw) | | 5 | 6 | 7 | 8 | 9 | 10 | 11 | 12 | 13 | 2 | 3 | 4 |
| Alcohol molecular weight and number of hydroxyl groups | Molecular weight | 76.1 | 92.1 | 106.1 | 134.8 | 250.3 | 120.2 | 136.2 | 182.2 | 76.1 | — | 270.5 | 400 |
| | Number of hydroxyl groups | 2 | 3 | 3 | 3 | 4 | 3 | 4 | 6 | 2 | — | 1 | 2 |
| | Molecular weight/ Number of hydroxyl groups | 38.1 | 30.7 | 35.4 | 44.9 | 62.6 | 40.1 | 34.1 | 30.4 | 38.1 | — | 270.5 | 200.0 |

Aside from the following ingredients, details on the ingredients in Table 6 are the same as in Table 1.

1,2,4-Butanetriol: Available from Tokyo Chemical Industries, Co., Ltd.

Trimethylolpropane: Available from Tokyo Chemical Industries, Co., Ltd.

Di(trimethylolpropane): Available from Tokyo Chemical Industries, Co., Ltd.

Trimethylolethane: Available from Tokyo Chemical Industries, Co., Ltd.

Pentaerythritol: Available from FUJIFULM Wako Pure Chemical Corporation

Sorbitol: Available from FUJIFULM Wako Pure Chemical Corporation

Stearyl alcohol: Available as "NAA-45" from NOF Corporation

Polyethylene glycol: Available as "Polyethylene Glycol #400" from NOF Corporation In Working Examples 5 to 13 and Comparative Examples 2 to 4, an intermediate is layer was formed over the core by injection-molding an intermediate layer material formulated as shown under II in above Table 2, thereby giving an intermediate layer-encased sphere. A cover (outermost layer) was then formed over the resulting intermediate layer-encased sphere by injection-molding a cover material formulated as shown under VIII in above Table 2. At this time, a plurality of dimples in a specific configuration common to all of the Working Examples and Comparative Examples was formed on the cover surface. Next, Paint Formulation "A" shown in above Table 3 was applied with an air spray gun onto the cover (outermost layer) surface on which numerous dimples had been formed, thereby producing a golf ball having a 15 μm-thick paint film layer formed thereon.

Various measurements and evaluations were carried out on the resulting golf balls in the same way as in Working Examples 1 to 4 and Comparative Example 1. The results are shown in Table 7.

TABLE 7

|  |  | Working Example | | | | | | | | | Comparative Example | | |
|---|---|---|---|---|---|---|---|---|---|---|---|---|---|
|  |  | 5 | 6 | 7 | 8 | 9 | 10 | 11 | 12 | 13 | 2 | 3 | 4 |
| Ball | Dynamic coefficient of friction | 0.31 | 0.31 | 0.31 | 0.31 | 0.31 | 0.31 | 0.31 | 0.31 | 0.31 | 0.31 | 0.31 | 0.31 |
|  | Deflection (mm) | 2.62 | 2.52 | 2.56 | 2.61 | 2.53 | 2.55 | 2.56 | 2.59 | 2.61 | 2.77 | 2.71 | 2.64 |
| Paint film | Formulation | A | A | A | A | A | A | A | A | A | A | A | A |
|  | Elastic work recovery (%) | 80.1 | 80.1 | 80.1 | 80.1 | 80.1 | 80.1 | 80.1 | 80.1 | 80.1 | 80.1 | 80.1 | 80.1 |
|  | Thickness (μm) | 15 | 15 | 15 | 15 | 15 | 15 | 15 | 15 | 15 | 15 | 15 | 15 |
| Cover | Material | VIII | VIII | VIII | VIII | VIII | VIII | VIII | VIII | VIII | VIII | VIII | VIII |
|  | Thickness (μm) | 0.8 | 0.8 | 0.8 | 0.8 | 0.8 | 0.8 | 0.8 | 0.8 | 0.8 | 0.8 | 0.8 | 0.8 |
|  | Material hardness (Shore D) | 47 | 47 | 47 | 47 | 47 | 47 | 47 | 47 | 47 | 47 | 47 | 47 |
| Intermediate layer | Material | II | II | II | II | II | II | II | II | II | II | II | II |
|  | Thickness (μm) | 1.2 | 1.2 | 1.2 | 1.2 | 1.2 | 1.2 | 1.2 | 1.2 | 1.2 | 1.2 | 1.2 | 1.2 |
|  | Material hardness (Shore D) | 64 | 64 | 64 | 64 | 64 | 64 | 64 | 64 | 64 | 64 | 64 | 64 |
| Inter-mediate layer-encased sphere | Surface hardness (JIS-C) | 98 | 98 | 98 | 98 | 98 | 98 | 98 | 98 | 98 | 98 | 98 | 98 |
| Core | Diameter (mm) | 38.65 | 38.65 | 38.65 | 38.65 | 38.65 | 38.65 | 38.65 | 38.65 | 38.65 | 38.65 | 38.65 | 38.65 |
|  | Deflection (mm) | 3.3 | 3.2 | 3.3 | 3.4 | 3.2 | 3.3 | 3.2 | 3.2 | 3.4 | 3.4 | 3.3 | 3.2 |
|  | Hardness profile (JIS-C) Center (Hc) | 60.9 | 60.6 | 60.7 | 61.0 | 61.6 | 60.9 | 61.6 | 62.1 | 59.4 | 65.0 | 64.8 | 65.1 |
|  | 2 mm from center | 62.0 | 61.9 | 61.9 | 62.0 | 62.1 | 61.9 | 62.2 | 62.2 | 60.7 | 65.3 | 65.1 | 65.4 |
|  | 4 mm from center | 62.9 | 62.6 | 62.8 | 63.0 | 62.8 | 62.8 | 63.6 | 62.7 | 61.4 | 65.6 | 65.2 | 65.7 |
|  | 6 mm from center | 64.7 | 64.5 | 64.6 | 64.8 | 64.6 | 64.7 | 64.5 | 64.6 | 63.6 | 66.4 | 65.9 | 66.7 |
|  | 8 mm from center | 66.1 | 66.0 | 66.1 | 66.2 | 66.0 | 66.1 | 66.0 | 66.0 | 64.4 | 68.7 | 68.2 | 68.9 |
|  | 10 mm from center (H10) | 67.1 | 66.7 | 67.0 | 67.3 | 68.1 | 68.2 | 67.8 | 67.8 | 65.3 | 69.9 | 69.4 | 70.8 |
|  | 12 mm from center (H12) | 72.8 | 72.6 | 72.7 | 72.7 | 72.7 | 72.7 | 72.7 | 72.7 | 71.1 | 72.7 | 72.1 | 73.2 |
|  | 14 mm from center | 77.9 | 78.5 | 78.1 | 77.5 | 78.3 | 78.0 | 78.3 | 78.5 | 76.5 | 77.1 | 76.5 | 77.8 |
|  | 16 mm from center | 82.9 | 82.4 | 82.8 | 83.1 | 82.6 | 82.8 | 82.6 | 82.7 | 81.6 | 79.9 | 79.3 | 80.1 |
|  | 18 mm from center | 83.1 | 82.5 | 82.9 | 83.5 | 82.8 | 84.3 | 83.7 | 83.5 | 82.1 | 79.3 | 78.5 | 79.6 |
|  | Surface (Ho) | 87.0 | 86.5 | 86.9 | 87.1 | 86.9 | 87.2 | 86.9 | 86.6 | 87.1 | 81.9 | 81.1 | 82.3 |
|  | (1)' Hardness difference H10 − Hc | 6.2 | 6.1 | 6.3 | 6.3 | 6.5 | 7.3 | 6.2 | 5.7 | 5.9 | 4.9 | 4.6 | 5.7 |
|  | (2)' Hardness difference Ho − H10 | 19.9 | 19.8 | 19.9 | 19.8 | 18.8 | 19.0 | 19.1 | 18.8 | 21.8 | 12.0 | 11.7 | 11.5 |
|  | (3)' Hardness difference (2)' − (1)' | 13.7 | 13.6 | 13.6 | 13.5 | 12.3 | 11.7 | 12.9 | 13.1 | 15.9 | 7.1 | 7.1 | 5.8 |
|  | (1) Hardness difference H12 − Hc | 11.9 | 12.0 | 12.0 | 11.7 | 11.1 | 11.8 | 11.1 | 10.6 | 11.7 | 7.6 | 7.3 | 8.1 |
|  | (2) Hardness difference Ho − H12 | 14.2 | 13.8 | 14.2 | 14.4 | 14.2 | 14.5 | 14.2 | 13.9 | 16.0 | 9.3 | 9.0 | 9.1 |

TABLE 7-continued

|  | Working Example | | | | | | | | | Comparative Example | | |
|---|---|---|---|---|---|---|---|---|---|---|---|---|
|  | 5 | 6 | 7 | 8 | 9 | 10 | 11 | 12 | 13 | 2 | 3 | 4 |
| (3) Hardness difference (2) − (1) | 2.4 | 1.8 | 2.2 | 2.7 | 3.1 | 2.7 | 3.1 | 3.3 | 4.3 | 1.6 | 1.7 | 1.0 |
| (4) Hardness difference Ho − Hc | 26.1 | 25.9 | 26.2 | 26.1 | 25.3 | 26.3 | 25.3 | 24.5 | 27.7 | 16.9 | 16.3 | 17.2 |
| Hardness profile index: (3)' × Core deflection | 45.2 | 43.6 | 44.5 | 45.4 | 39.9 | 38.5 | 41.4 | 42.3 | 54.6 | 23.8 | 23.4 | 18.5 |
| Spin index: (3)' × Dynamic coefficient of friction | 4.2 | 4.2 | 4.2 | 4.2 | 3.8 | 3.6 | 4.0 | 4.1 | 4.9 | 2.2 | 2.2 | 1.8 |
| Hardness relationship: Intermediate layer surface − Core surface (JIS-C) | 11.0 | 11.5 | 11.1 | 10.9 | 11.1 | 10.8 | 11.1 | 11.4 | 10.9 | 16.1 | 16.9 | 15.7 |

In addition, the flight performance (W #1) and spin rate on approach shots in each of the Working Examples and Comparative Examples were evaluated based on the same criteria as for Working Examples 1 to 4 and Comparative Example 1. Those results are presented in Table 8.

TABLE 8

|  |  | Working Example | | | | | | | | | Comparative Example | | |
|---|---|---|---|---|---|---|---|---|---|---|---|---|---|
|  |  | 5 | 6 | 7 | 8 | 9 | 10 | 11 | 12 | 13 | 2 | 3 | 4 |
| Flight (W#1; HS, 50 m/s) | Initial velocity (m/s) | 72 | 72 | 72 | 72 | 72 | 72 | 72 | 72 | 72 | 72 | 72 | 72 |
|  | Spin rate (rpm) | 2,541 | 2,604 | 2,622 | 2,575 | 2,631 | 2,637 | 2,618 | 2,592 | 2,627 | 2,878 | 2,844 | 2,908 |
|  | Distance (m) | 267.6 | 265.5 | 264.9 | 266.4 | 264.6 | 264.4 | 265.0 | 265.9 | 264.7 | 256.3 | 257.4 | 255.3 |
|  | Rating | good | good | good | good | good | good | good | good | good | NG | NG | NG |
| Spin performance on approach shots (SW) | Spin rate (rpm) | 1,337 | 1,349 | 1,344 | 1,338 | 1,348 | 1,345 | 1,344 | 1,340 | 1,338 | 1,319 | 1,326 | 1,334 |
|  | Rating | good | good | good | good | good | good | good | good | good | good | good | good |

The following was apparent from the test results in Table 8.

In Comparative Example 2, the formula (4) "Ho–Hc" value in the core hardness profile was small and the core formulation did not include component (d). As a result, the spin rate on shots with a W #1 increased, resulting in a poor flight performance.

The following was apparent from the test results in Table 8.

In both Comparative Examples 3 and 4, the formula (4) "Ho–Hc" value in the core hardness profile was small and the alcohols used in the core formulations had values, obtained by dividing the molecular weights of the alcohols by the number of hydroxyl groups thereon, that were higher than 70. As a result, the spin rate on shots with a W #1 increased, resulting in a poor flight performance.

The invention claimed is:

1. A multi-piece solid golf ball comprising a core, a cover, and an intermediate layer situated therebetween and having a paint film layer formed on a surface of the cover, wherein the core is formed of a rubber composition containing the following ingredients (a) to (d):
(a) a base rubber,
(b) a co-crosslinking agent which is an α,β-unsaturated carboxylic acid or a metal salt thereof or both,
(c) a crosslinking initiator, and
(d) an alcohol having a value obtained by dividing the molecular weight of the alcohol by the number of hydroxyl groups thereon which is 70 or less; and,
letting Hc be the JIS-C hardness at a center of the core, H12 be the JIS-C hardness at a position 12 mm from the core center and Ho be the JIS-C hardness at a surface of the core, the core has a hardness profile which satisfies formulas (3) and (4) below $$(Ho-H12)-(H12-Hc) \geq 0 \qquad (3)$$

$$22 \leq Ho-Hc \leq 40 \qquad (4), and$$

wherein component (d) is included in an amount, per 100 parts by weight of the base rubber (a), of from 0.5 to 5 parts by weight.

2. The golf ball of claim 1, wherein the ball has a dynamic coefficient of friction which is 0.300 or more.

3. The golf ball of claim 1, wherein the JIS-C hardness Hc at the core center is from 40 to 78 and the JIS-C hardness Ho at the core surface is from 65 to 99.

4. The golf ball of claim 1 wherein, letting H10 be the JIS-C hardness at a position 10 mm from the core center, the core hardness profile satisfies formula (1)' below $$0 \leq H10-Hc \leq 15 \qquad (1)'.$$

5. The golf ball of claim 1 wherein, letting H10 be the JIS-C hardness at a position 10 mm from the core center, the core hardness profile satisfies formula (2)' below $$15 \leq Ho-H10 \leq 30 \qquad (2)'.$$

6. The golf ball of claim 1 wherein, letting H10 be the JIS-C hardness at a position 10 mm from the core center, the core hardness profile satisfies formula (3)' below $$(Ho-H10)-(H10-Hc) \geq 10 \qquad (3').$$

7. The golf ball of claim 6 wherein, letting (Ho−H10)−(H10−Hc) in formula (3)' be A', the spin index, defined as the dynamic coefficient of friction for the ball multiplied by A', is 3.0 or more.

8. The golf ball of claim 6 wherein, letting (Ho−H10)−(H10−Hc) in formula (3)' be A', the hardness profile index, defined as the deflection (mm) of the core when compressed under a final load of 1,275 N (130 kgf) from an initial load of 98 N (10 kgf) multiplied by A', is 30 or more.

9. The golf ball of claim 1, wherein component (d) is a hexahydric or lower alcohol.

10. The golf ball of claim 1, wherein component (d) is selected from the group consisting of butanol, glycerol, ethylene glycol, propylene glycol, butanetriol, trimethylolethane, trimethylolpropane, di(trimethylolpropane), pentaerythritol and sorbitol.

11. The golf ball of claim 1, wherein component (d) is included in an amount, per 100 parts by weight of the base rubber (a), of from 0.5 to 3 parts by weight.

* * * * *